US007229686B2

(12) United States Patent
Yoshikawa et al.

(10) Patent No.: US 7,229,686 B2
(45) Date of Patent: Jun. 12, 2007

(54) ANTIREFLECTION FILM AND MAKING METHOD

(75) Inventors: Yuji Yoshikawa, Usui-gun (JP); Masaaki Yamaya, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 384 days.

(21) Appl. No.: 10/668,361

(22) Filed: Sep. 24, 2003

(65) Prior Publication Data

US 2004/0058177 A1    Mar. 25, 2004

(30) Foreign Application Priority Data

Sep. 25, 2002    (JP)    ............... 2002-279456

(51) Int. Cl.
  B32B 7/12   (2006.01)
  B32B 27/30  (2006.01)
  B32B 27/32  (2006.01)
  B32B 27/38  (2006.01)
  B05D 1/38   (2006.01)

(52) U.S. Cl. ............... 428/343; 428/332; 428/413; 428/414; 428/500; 428/522; 428/523; 427/162; 427/202; 427/203; 427/204; 427/402; 349/137

(58) Field of Classification Search ............... None
See application file for complete search history.

(56) References Cited

U.S. PATENT DOCUMENTS

| | | | |
|---|---|---|---|
| 5,874,801 A | 2/1999 | Kobayashi et al. | |
| 6,657,691 B2 * | 12/2003 | Ochiai et al. | 349/137 |
| 2001/0031317 A1 | 10/2001 | Hasegawa et al. | |
| 2002/0021393 A1 * | 2/2002 | Ochiai et al. | 349/137 |
| 2004/0156110 A1 * | 8/2004 | Ikeyama | 359/603 |
| 2005/0109238 A1 * | 5/2005 | Yamaki et al. | 106/287.16 |

FOREIGN PATENT DOCUMENTS

| | | |
|---|---|---|
| EP | 0 778 476 | 6/1997 |
| EP | 1 022 587 | 7/2000 |
| EP | 1 089 093 | 4/2001 |
| EP | 1 279 443 | 1/2003 |
| JP | 6-11601 | 1/1994 |
| JP | 7-60856 | 3/1995 |
| JP | 8-313704 | 11/1996 |
| JP | 9-227169 | 9/1997 |
| JP | 10-147740 | 6/1998 |
| JP | 2800258 | 7/1998 |
| JP | 200-6402 | 1/2000 |
| JP | 2000-17099 | 1/2000 |
| JP | 2000-47004 | 2/2000 |
| JP | 3031571 | 2/2000 |
| JP | 2000-79600 | 3/2000 |
| JP | 2000-143924 | 5/2000 |
| JP | 2000-204301 | 7/2000 |
| JP | 2000-266908 | 9/2000 |
| JP | 2000-284235 | 10/2000 |
| JP | 2000-329903 | 11/2000 |
| JP | 2001-31891 | 2/2001 |
| JP | 2001-163906 | 6/2001 |
| JP | 2001-164117 | 6/2001 |
| JP | 2001-233611 | 8/2001 |
| JP | 3225859 | 8/2001 |
| JP | 2001-264508 | 9/2001 |
| JP | 2001-293813 | 10/2001 |
| JP | 2001-315285 | 11/2001 |
| JP | 2001-316604 | 11/2001 |
| JP | 2002-22905 | 1/2002 |
| JP | 2002-53804 | 2/2002 |
| JP | 2002-53805 | 2/2002 |
| JP | 2002-69426 | 3/2002 |
| JP | 2002-79616 | 3/2002 |
| WO | WO 02/075373 | * 9/2002 |

* cited by examiner

*Primary Examiner*—Michael J. Feely
(74) *Attorney, Agent, or Firm*—Oblon, Spivak, McClelland, Maier & Neustadt, P.C.

(57) ABSTRACT

A high refractive index layer of a cured first coating composition comprising (A) metal oxide fine particles selected from among titanium oxide, aluminum oxide, zirconium oxide, cerium oxide, iron oxide, tin oxide, and compound oxides thereof and (B) a compound having an acrylic, methacrylic, vinyl or styryl group, and a low refractive index layer of a cured second coating composition comprising (D) voided silica-base inorganic oxide fine particles and (C) a compound having at least two epoxy and/or oxetane groups are successively stacked on a substrate to form an antireflection film.

9 Claims, No Drawings

ANTIREFLECTION FILM AND MAKING METHOD

TECHNICAL FIELD

This invention relates to an antireflection film comprising high and low refractive index layers, cured by exposure to actinic energy radiation, and having improved antireflection, transparency, adhesion, processing cost and processing time, a method of preparing the same, and a laminate for forming the same.

BACKGROUND ART

As display terminals for information visualization such as CRT and LC monitors become widespread, there is an increasing possibility that the reflection of extraneous light in the use environment impair operators' eyesight, at worst causing asthenopia and sight weakening. There is a demand for visual display terminals having minimized reflection of extraneous light. This problem is often solved by applying antireflection films directly to visual display terminals. Typical antireflection films are laminates of high and low refractive index layers with controlled thickness that reduce the reflectance by utilizing the interference of incident light.

In the prior art, physical means of depositing inorganic oxides or fluorinated inorganic compounds in multilayer fashion by vacuum evaporation or sputtering are commonly used as disclosed in JP-A 6-11601, JP-A 7-60856 and JP-A 2000-284235. Since an expensive vacuum evaporation apparatus or sputtering apparatus must be employed in the manufacture of antireflection film-bearing articles and too much processing time and cost are needed, this approach is difficult to apply antireflection films to visual display terminals at low cost.

On the other hand, chemical means of applying coating compositions comprising organic silane compounds, inorganic fines and the like in multilayer fashion as described in JP-A 2001-293813 have advantages including elimination of expensive apparatus. In the practice of this chemical approach, titanium oxide and other oxides for imparting a high refractive index are generally employed in the high refractive index coating composition as described in Japanese Patent No. 3,031,571 and JP-A 2000-204301. Most often, photo-curable coating compositions comprising a titanium-containing alkoxide, inorganic fine particles and a polyfunctional acrylate or epoxy compound are used. See JP-A 2000-6402, JP-A 2000-47004, JP-A 2000-143924, JP-A 2000-266908, JP-A 2000-329903 and JP-A 2001-164117.

As the low refractive index coating composition, compositions containing fluorinated compounds are customary as described in Japanese Patent No. 2,800,258 and JP-A 10-147740. However, most of these compositions need heat treatment by which the substrate is limited, and suffer from problems including a long curing time and a low hardness.

To solve these problems, photo-curable materials containing fluorinated compounds are utilized as described in JP-A 8-313704, JP-A 2001-264508, JP-A 2002-22905, JP-A 2002-53804, JP-A 2002-53805, and JP-A 2002-69426. Also, photo-curable materials containing metal oxide fine particles are utilized for the purpose of increasing hardness as described in JP-A 2001-316604. However, there is a problem that no coatings can be formed on coatings of fluorinated materials, which is inadequate for antireflection films of the transfer type which require to form a high refractive index layer on a low refractive index layer.

There is a desire to have low refractive index coating compositions other than fluorinated materials. JP-A 2001-31891 discloses a coating composition comprising an inorganic oxide sol and a silane coupling agent; JP-A 2000-79600 and JP-A 2001-163906 disclose a method of forming a nano-porous structure using a silica sol having a particle size of 50 to 100 nm and a polyfunctional acrylate; and JP-A 2000-17099 discloses a method of forming a film with micro-voids or spaces. These methods are not so successful in lowering the refractive index.

JP-A 2001-233611 and JP-A 2002-79616 disclose the use of hollow silica sol, which is successful in lowering the refractive index, but suffers from problems like a need for heat treatment, limited substrates, and a long curing time.

From the past, a method of imparting the desired function to a primary substrate by laying a functional film on another substrate film and transferring it to the primary substrate is known in the applications to impart surface protection and photo-catalysis functions as described in JP-A 9-227169, Japanese Patent No. 3,225,859 and JP-A 2001-315285. No proposal has been made in the application to impart an antireflection function.

SUMMARY OF THE INVENTION

An object of the invention is to provide an antireflection film comprising high and low refractive index layers which possesses a high level of antireflection function despite the absence of fluorinated compounds in the low refractive index layer, is curable by exposure to actinic energy radiation, and has improved hardness, transparency, adhesion, processing cost and processing time, a method of preparing the same, and an article bearing the same. A further object is to provide an antireflection film-forming laminate of the transfer type in which a high refractive index layer can be formed on a low refractive index layer which is devoid of fluorinated compounds.

Searching for an antireflection film which is curable upon exposure to actinic energy radiation and improved in antireflection, transparency, adhesion, processing cost and processing time, the inventors have discovered that the object is attained by successively stacking a high refractive index layer composed of metal oxide fine particles and a radical reactive compound and a low refractive index layer composed of voided silica-base inorganic oxide fine particles and a cationic reactive compound. An antireflection film-forming laminate of the transfer type is obtainable because no fluorinated compounds are incorporated in the low refractive index layer. Then the hardness problem which is a shortcoming of fluorinated compounds is solved, resulting in an antireflection film possessing a high hardness.

In a first aspect, the invention provides an antireflection film to be formed on at least one surface of a substrate, comprising a high refractive index layer formed of a first coating composition in the cured state primarily comprising (A) metal oxide fine particles comprising at least one oxide selected from among titanium oxide, aluminum oxide, zirconium oxide, cerium oxide, iron oxide, tin oxide, and compound oxides thereof, and having an average particle size of 1 to 500 nm, and (B) a compound having in a molecule at least one group of at least one type selected from among an acrylic, methacrylic, vinyl and styryl group, and/or (C) a compound having in a molecule at least two groups of at least one type selected from among an epoxy and oxetane group, and a low refractive index layer formed of a second coating composition in the cured state primarily comprising (D) silica-base inorganic oxide fine particles having void in the interior and having an average particle size of 1 to 500 nm, and (B) a compound having in a molecule at least one group of at least one type selected from among an acrylic, methacrylic, vinyl and styryl group, and/or (C) a compound having in a molecule at least two groups of at least one type selected from among an epoxy and oxetane group, the high refractive index layer and the low refractive index layer being successively stacked.

In one preferred embodiment, the antireflection film comprises a high refractive index layer formed of a first coating composition in the cured state primarily comprising (A) metal oxide fine particles comprising at least one oxide selected from among titanium oxide, aluminum oxide, zirconium oxide, cerium oxide, iron oxide, tin oxide, and compound oxides thereof, and having an average particle size of 1 to 500 nm, and (B) a compound having in a molecule at least one group of at least one type selected from among an acrylic, methacrylic, vinyl and styryl group; and a low refractive index layer formed of a second coating composition in the cured state primarily comprising (D) silica-base inorganic oxide fine particles having void in the interior and having an average particle size of 1 to 500 nm, and (C) a compound having in a molecule at least two groups of at least one type selected from among an epoxy and oxetane group; the high refractive index layer and the low refractive index layer being successively stacked.

In a second aspect, the invention provides an antireflection film-bearing article having the antireflection film formed on at least one surface of a substrate.

In a third aspect, the invention provides a method for preparing an antireflection film-bearing article, comprising the steps of applying a first coating composition as set forth above further containing (E) a radical initiator and optionally (F) a solvent onto at least one surface of a substrate; irradiating the coating with actinic energy radiation to form a first cured film; applying a second coating composition as set forth above further containing (G) a photoacid generator and optionally (H) a solvent onto the first cured film; and irradiating the coating with actinic energy radiation to form a second cured film.

In a fourth aspect, the invention provides a method for preparing an antireflection film-bearing article, comprising the steps of applying a second coating composition as set forth above further containing (G) a photoacid generator and optionally (H) a solvent onto one surface of a temporary substrate optionally having a strippable layer formed thereon; irradiating the coating with actinic energy radiation to form a second cured film; applying a first coating composition as set forth above further containing (E) a radical initiator and optionally (F) a solvent onto the second cured film; irradiating the coating with actinic energy radiation to form a first cured film; attaching the resulting laminate to a substrate using an adhesive or pressure-sensitive adhesive; and stripping the temporary substrate.

In a fifth aspect, the invention provides a laminate for forming an antireflection film-bearing article, which is prepared by applying a second coating composition as set forth above further containing (G) a photoacid generator and optionally (H) a solvent onto one surface of a temporary substrate optionally having a strippable layer formed thereon; irradiating the coating with actinic energy radiation to form a second cured film; applying a first coating composition as set forth above further containing (E) a radical initiator and optionally (F) a solvent onto the second cured film; irradiating the coating with actinic energy radiation to form a first cured film; and forming an adhesive or pressure-sensitive adhesive layer on the first cured film for allowing the film to be subsequently attached to a substrate.

DESCRIPTION OF THE PREFERRED EMBODIMENTS

Component (A) serves to impart a high refractive index function and is metal oxide fine particles comprising at least one oxide selected from the group consisting of titanium oxide, aluminum oxide, zirconium oxide, cerium oxide, iron oxide, tin oxide, and compound oxides thereof. The metal oxide fine particles are dispersed in water or an organic solvent in colloidal state to form a dispersion which is ready for use herein. Also useful are compound oxides containing any of the foregoing oxides and other oxides such as silicon oxide, boron oxide, antimony oxide, molybdenum oxide, zinc oxide and tungsten oxide.

The preferred dispersing media are organic solvents, for example, alcohols such as methanol, ethanol, isopropanol, butanol, octanol, propylene glycol monomethyl ethers and diacetone alcohol; ketones such as acetone, methyl ethyl ketone, methyl isobutyl ketone, and cyclohexanone; esters such as ethyl acetate, butyl acetate, ethyl lactate, γ-butyrolactone, propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, and xylene; and amides such as dimethylformamide, dimethylacetamide and N-methylpyrrolidone. Inter alia, methanol, isopropanol, butanol, propylene glycol monomethyl ether, diacetone alcohol, methyl ethyl ketone, and methyl isobutyl ketone are preferred.

The metal oxide fine particles should have an average particle size in the range of 1 to 500 nm, preferably 1 to 200 nm. An average particle size of more than 500 nm tends to detract from the transparency of a cured film and exacerbate the surface state thereof. In order to enhance the dispersion stability of fine particles in a coating solution, the fine particles may have been surface treated with organosilicon compounds or the like prior to use.

The concentration of titanium oxide, aluminum oxide, zirconium oxide, cerium oxide, iron oxide, tin oxide, or compound oxides thereof in the dispersion is preferably 1 to 70% by weight, especially 5 to 40% by weight.

Component (D) serves to impart a low refractive index function and is silica-base inorganic oxide fine particles having void in the interior. Like component (A), component (D) may be used as a dispersion. The silica-base inorganic oxide fine particles are particles each having a shell and a porous or vacant core. The void in the interior may consist of either micro-pores or a vacant cavity. The percent void volume may be at least 10% by volume. It is noted that the voids in the inorganic compound fine particles are maintained in a transparent coating as well. The voids are filled with such contents as gases or the solvent which is used during the preparation of inorganic compound fine particles. The inorganic oxide fine particles should have an average particle size in the range of 1 to 500 nm, preferably 5 to 200 nm.

In the voided fine particles, the shell desirably has a thickness in the range of 1 to 20 nm, more preferably 1 to 15 nm. A shell with a thickness of less than 1 nm may sometimes fail to enclose the particle completely, giving rise to problems of allowing any component used to form the matrix to penetrate into the inorganic compound particles, detracting from the internal porosity, as well as failure to fully exert the low refractive index effect and failure to retain the particulate shape. A shell with a thickness of more than 20 nm indicates an increased proportion of the shell and hence, a decreased proportion of porous material in the core or a decreased void volume, sometimes failing to fully exert the low refractive index effect.

Preferably the shell is made mainly of silica. The shells of inorganic compound particles may contain an ingredient other than silica. Specifically, use may be made of an oxide selected from the group consisting of titanium oxide, aluminum oxide, zirconium oxide, cerium oxide, iron oxide, tin oxide, boron oxide, antimony oxide, molybdenum oxide, zinc oxide, and tungsten oxide. The porous core within the shell may be composed of silica alone, a mixture of silica and another inorganic compound, or a fluoride such as $CaF_2$, NaF, $NaAlF_6$, or MgF. Of these, silica alone and compound oxides of silica with another inorganic compound are preferred as the core. The other inorganic compound is typically selected from among titanium oxide, aluminum oxide, zirconium oxide, cerium oxide, iron oxide, tin oxide, boron oxide, antimony oxide, molybdenum oxide, zinc oxide, and tungsten oxide.

The dispersing medium may be the same as enumerated for component (A). The concentration of silica-base inorganic oxide fine particles in the dispersion is preferably 1 to 70% by weight, especially 5 to 40% by weight.

Commercially available products may be used as components (A) and (D). For example, Optolake (Catalysts & Chemicals Ind. Co., Ltd.), TSK-5 (Ishihara Sangyo Kaisha, Ltd.), Tinock (Taki Chemical Co., Ltd.), and HIT Sol (Nissan Chemical Industries, Ltd.) are available as component (A). A typical product of component (D) is Oscal (Catalysts & Chemicals Ind. Co., Ltd.).

Component (B) is a binder for component (A) or (D) and especially suited for component (A). It is a compound having in a molecule at least one group of at least one type selected from the class consisting of an acrylic, methacrylic, vinyl and styryl group, preferably a compound having at least two acrylic groups in a molecule, and more preferably a compound having at least two acrylic groups and a benzene ring in a molecule. Examples of the compound having at least two acrylic groups in a molecule include polyethylene glycol diacrylate, glycerin triacrylate, trimethylol propane triacrylate, pentaerythritol triacrylate, pentaerythritol tetraacrylate, dipentaerythritol pentaacrylate, dipentaerythritol hexaacrylate, and alkyl-modified dipentaerythritol pentaerythritol. Examples of such compounds further having a benzene ring include ethylene oxide-modified bisphenol A diacrylate, modified bisphenol A diacrylate ethylene glycol diacrylate, ethylene oxide/propylene oxide-modified bisphenol A diacrylate, propylene oxide/tetramethylene oxide-modified bisphenol A diacrylate, bisphenol A-diepoxy-acrylic acid adducts, ethylene oxide-modified bisphenol F diacrylate, and polyester acrylates.

Component (C) is a binder for component (A) or (D) and especially suited for component (D). It is a compound having in a molecule at least two groups of at least one type selected from the class consisting of an epoxy and oxetane group, preferably a compound having 3,4-epoxycyclohexyl groups in a molecule, and more preferably a silicone compound of a straight, cyclic or branched structure containing at least two —$R^1CH_3SiO$— units (wherein $R^1$ is a substituent group having a 3,4-epoxycyclohexyl group), having a molecular weight of 500 to 2,100 and an epoxy equivalent of 180 to 270, and being free of an alkoxy group.

Preferred silicone compounds of straight structure are those of the formula:

$$R^3(CH_3)_2SiO(R^1CH_3SiO)_a(R^2CH_3SiO)_bSi(CH_3)_2R^3$$

and more preferably $$(CH_3)_3SiO(R^1CH_3SiO)_mSi(CH_3)_3.$$

Herein, $R^1$ is a monovalent organic group having an epoxycyclohexyl group, for example, an epoxycyclohexylalkyl group such as 3,4-epoxycyclohexylethyl. $R^2$ is a group other than $R^1$, specifically a hydrogen atom or a substituted or unsubstituted monovalent hydrocarbon group having 1 to 10 carbon atoms, for example, alkyl groups such as methyl, ethyl, propyl, butyl, hexyl, and octyl, aryl groups such as phenyl and tolyl, alkenyl groups such as vinyl and allyl, and substituent groups containing a glycidyl, methacrylic, acrylic, mercapto or amino group. $R^3$ is as defined for $R^1$ or $R^2$. The subscript "a" is a number of 2 to 10, b is a number of 0 to 8, a+b is from 2 to 10, and m is a number of 2 to 10.

Preferred silicone compounds of cyclic structure are those of the formula:

$$(R^1CH_3SiO)_c(R^2CH_3SiO)_d$$

and more preferably $$(R^1CH_3SiO)_n.$$

Herein, $R^1$ and $R^2$ are as defined above, c is a number of 2 to 5, d is a number of 0 to 3, c+d is from 3 to 5, and n is a number of 3 to 5.

Preferred silicone compounds of branched structure are those of the formula:

$$(R^1CH_3SiO)_3R^3Si$$

wherein $R^1$ and $R^3$ are as defined above.

These compounds can be obtained through addition reaction or hydrosilylation of 4-vinylcyclohexene oxide with hydrogenpolysiloxane in the presence of a catalyst such as platinum compounds.

Illustrative non-limiting examples of the silicone compounds are given below.

$(CH_3)_3SiO(R^1CH_3SiO)_5Si(CH_3)_3$,
$(CH_3)_3SiO(R^1CH_3SiO)_6Si(CH_3)_3$,
$(CH_3)_3SiO(R^1CH_3SiO)_7Si(CH_3)_3$,
$(CH_3)_3SiO(R^1CH_3SiO)_8Si(CH_3)_3$,
$(CH_3)_3SiO(R^1CH_3SiO)_9Si(CH_3)_3$,
$(CH_3)_3SiO(R^1CH_3SiO)_{10}Si(CH_3)_3$,
$R^1(CH_3)_2SiO(R^1CH_3SiO)Si(CH_3)_2R^1$,
$R^1(CH_3)_2SiO(R^1CH_3SiO)_2Si(CH_3)_2R^1$,
$R^1(CH_3)_2SiO(R^1CH_3SiO)_3Si(CH_3)_2R^1$,
$R^1(CH_3)_2SiO(R^1CH_3SiO)_4Si(CH_3)_2R^1$,
$R^1(CH_3)_2SiO(R^1CH_3SiO)_5Si(CH_3)_2R^1$,
$R^1(CH_3)_2SiO(R^1CH_3SiO)_6Si(CH_3)_2R^1$,
$R^1(CH_3)_2SiO(R^1CH_3SiO)_7Si(CH_3)_2R^1$,
$R^1(CH_3)_2SiO(R^1CH_3SiO)_8Si(CH_3)_2R^1$,
$R^1(CH_3)_2SiO(R^1CH_3SiO)_9Si(CH_3)_2R^1$,
$R^1(CH_3)_2SiO(R^1CH_3SiO)_2((CH_3)_2SiO)_2Si(CH_3)_2R^1$,
$R^1(CH_3)_2SiO(R^1CH_3SiO)_3((CH_3)_2SiO)Si(CH_3)_2R^1$,
$R^1(CH_3)_2SiO(R^1CH_3SiO)_3((CH_3)_2SiO)_2Si(CH_3)_2R^1$,
$R^1(CH_3)_2SiO(R^1CH_3SiO)_4((CH_3)_2SiO)Si(CH_3)_2R^1$,
$R^1(CH_3)_2SiO(R^1CH_3SiO)_4((CH_3)_2SiO)_2Si(CH_3)_2R^1$,
$R^1(CH_3)_2SiO(R^1CH_3SiO)_5((CH_3)_2SiO)Si(CH_3)_2R^1$,
$R^1(CH_3)_2SiO(R^1CH_3SiO)_5((CH_3)_2SiO)_2Si(CH_3)_2R^1$,
$R^1(CH_3)_2SiO(R^1CH_3SiO)_5((CH_3)_2SiO)_3Si(CH_3)_2R^1$,
$R^1(CH_3)_2SiO(R^1CH_3SiO)_6((CH_3)_2SiO)Si(CH_3)_2R^1$,
$R^1(CH_3)_2SiO(R^1CH_3SiO)_6((CH_3)_2SiO)_2Si(CH_3)_2R^1$,

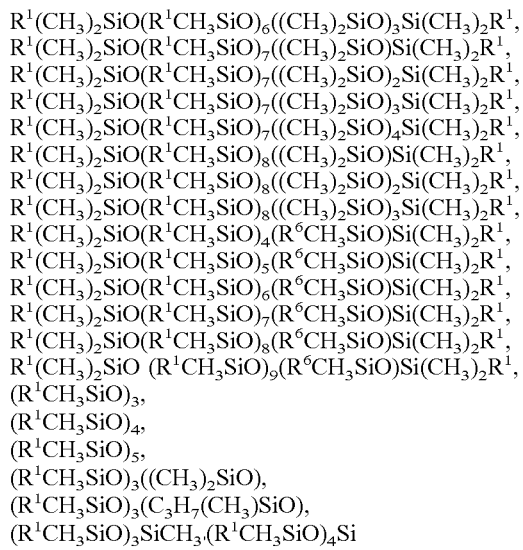

R$^1$(CH$_3$)$_2$SiO(R$^1$CH$_3$SiO)$_6$((CH$_3$)$_2$SiO)$_3$Si(CH$_3$)$_2$R$^1$,
R$^1$(CH$_3$)$_2$SiO(R$^1$CH$_3$SiO)$_7$((CH$_3$)$_2$SiO)Si(CH$_3$)$_2$R$^1$,
R$^1$(CH$_3$)$_2$SiO(R$^1$CH$_3$SiO)$_7$((CH$_3$)$_2$SiO)$_2$Si(CH$_3$)$_2$R$^1$,
R$^1$(CH$_3$)$_2$SiO(R$^1$CH$_3$SiO)$_7$((CH$_3$)$_2$SiO)$_3$Si(CH$_3$)$_2$R$^1$,
R$^1$(CH$_3$)$_2$SiO(R$^1$CH$_3$SiO)$_7$((CH$_3$)$_2$SiO)$_4$Si(CH$_3$)$_2$R$^1$,
R$^1$(CH$_3$)$_2$SiO(R$^1$CH$_3$SiO)$_8$((CH$_3$)$_2$SiO)Si(CH$_3$)$_2$R$^1$,
R$^1$(CH$_3$)$_2$SiO(R$^1$CH$_3$SiO)$_8$((CH$_3$)$_2$SiO)$_2$Si(CH$_3$)$_2$R$^1$,
R$^1$(CH$_3$)$_2$SiO(R$^1$CH$_3$SiO)$_8$((CH$_3$)$_2$SiO)$_3$Si(CH$_3$)$_2$R$^1$,
R$^1$(CH$_3$)$_2$SiO(R$^1$CH$_3$SiO)$_4$(R$^6$CH$_3$SiO)Si(CH$_3$)$_2$R$^1$,
R$^1$(CH$_3$)$_2$SiO(R$^1$CH$_3$SiO)$_5$(R$^6$CH$_3$SiO)Si(CH$_3$)$_2$R$^1$,
R$^1$(CH$_3$)$_2$SiO(R$^1$CH$_3$SiO)$_6$(R$^6$CH$_3$SiO)Si(CH$_3$)$_2$R$^1$,
R$^1$(CH$_3$)$_2$SiO(R$^1$CH$_3$SiO)$_7$(R$^6$CH$_3$SiO)Si(CH$_3$)$_2$R$^1$,
R$^1$(CH$_3$)$_2$SiO(R$^1$CH$_3$SiO)$_8$(R$^6$CH$_3$SiO)Si(CH$_3$)$_2$R$^1$,
R$^1$(CH$_3$)$_2$SiO (R$^1$CH$_3$SiO)$_9$(R$^6$CH$_3$SiO)Si(CH$_3$)$_2$R$^1$,
(R$^1$CH$_3$SiO)$_3$,
(R$^1$CH$_3$SiO)$_4$,
(R$^1$CH$_3$SiO)$_5$,
(R$^1$CH$_3$SiO)$_3$((CH$_3$)$_2$SiO),
(R$^1$CH$_3$SiO)$_3$(C$_3$H$_7$(CH$_3$)SiO),
(R$^1$CH$_3$SiO)$_3$SiCH$_3$,(R$^1$CH$_3$SiO)$_4$Si

Note that R$^6$ is methacryloxypropyl.

In the invention, the first coating composition for forming a high refractive index layer contains component (A) and component (B) and/or (C) as main components; and the second coating composition for forming a low refractive index layer contains component (D) and component (B) and/or (C) as main components. Preferably, the first coating composition contains component (A) and component (B) as main components; and the second coating composition contains component (D) and component (C) as main components, because higher transparency is achieved.

In preparing the first coating composition, components (A) and (B) are preferably mixed in a weight ratio of from 10/90 to 90/10, especially from 20/80 to 70/30 as solids. In preparing the second coating composition, components (D) and (C) are preferably mixed in a weight ratio of from 10/90 to 90/10, especially from 20/80 to 70/30 as solids.

In order that the coating composition containing component (B) cure by light exposure, component (E) should be incorporated in the composition. Component (E) is a radical polymerization initiator which is dissolvable in the components blended. Any desired initiator capable of generating a radical upon exposure to light may be used. Illustrative examples of the radical polymerization initiator include diethoxyacetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tert-butyldichloroacetophenone, p-tert-butyltrichloroacetophenone, p-azidobenzalacetophenone, 1-hydroxycyclohexylphenylketone, 2-methyl-1-[4-(methylthio)phenyl]-2-morpholinopropanone-1, 2-benzyl-2-dimethylamino-1-(4-morpholinophenyl)-butanone-1, benzoin, benzoin methyl ether, benzoin ethyl ether, benzoin isopropyl ether, benzoin n-butyl ether, benzoin isobutyl ether, benzyl, anisil, benzophenone, methyl o-benzoylbenzoate, Michler's ketone, 4,4'-bisdiethylaminobenzophenone, 4,4'-dichlorobenzophenone, 4-benzoyl-4'-methyldiphenylsulfide, thioxanthone, 2-methylthioxanthone, 2-ethylthioxanthone, 2-chlorothioxanthone, 2-isopropylthioxanthone, 2,4-diethylthioxanthone, bis(cyclopentadienyl)-bis(2,6-difluoro-3-(pyr-1-yl)titanium, and 1-(4-(2-hydroxyethoxy)phenyl)-2-hydroxydi-2-methyl-1-propan-1-one.

These radical polymerization initiators may be used alone or in admixture of two or more depending on their capability.

An appropriate amount of the radical polymerization initiator (E) is 0.05 to 20% by weight, more preferably 0.1 to 15% by weight based on the radical polymerizable compound (B). Outside the range, excessive amounts of the initiator may adversely affect strength whereas less amounts of the initiator may be insufficient for the resin to cure.

In order that the coating composition containing component (C) cure by light exposure, component (G) should be incorporated in the composition. Component (G) is a photoacid generator or photo-initiator which is dissolvable in the components blended. Any desired photo-initiator capable of opening an epoxy ring upon exposure to light may be used.

Preferred are onium salt photo-initiators, examples of which include diaryl iodonium salts, triaryl sulfonium salts, monoaryl dialkyl sulfonium salts, triaryl selenonium salts, tetraaryl phosphonium salts, and aryldiazonium salts as represented by $R^7_2I^+X^-$, $R^7_3S^+X^-$, $R^7_2R^8S^+X^-$, $R^7R^8_2S^+X^-$, $R^7_3Se^+X^-$, $R^7_4P^+X^-$, and $R^7N_2^+X^-$, respectively, wherein R$^7$ is aryl, R$^8$ is alkyl, and X$^-$ is an anion such as $SbF_6^-$, $AsF_6^-$, $PF_6^-$, $BF_4^-$, $HSO_4^-$, $ClO_4^-$, $Cl^-$ or $CF_3SO_3^-$.

For compatibility with component (D), salts represented by $R^4_2I^+X^-$ are preferred wherein R$^4$ is a group —C$_6$H$_4$—R$^5$, R$^5$ is an alkyl group having at least 6 carbon atoms, preferably 6 to 30 carbon atoms, more preferably 6 to 20 carbon atoms, and X$^-$ is $SbF_6^-$, $AsF_6^-$, $PF_6^-$, $BF_4^-$, $HSO_4^-$, $ClO_4^-$, $Cl^-$ or $CF_3SO_3^-$.

The amount of the photo-cationic initiator or photoacid generator (G) added is preferably 0.1 to 5 parts by weight per 100 parts by weight of component (C). Less than 0.1 part of the photoacid generator may provide an insufficient curing ability to invite curing expansion whereas more than 5 parts may achieve no further effects and be uneconomical.

In addition to the essential components, any additives such as acrylic resins, silicone resins, antifoamers, leveling agents, and lubricants may be incorporated in the coating compositions as long as the objects of the invention are not impaired.

The first and second coating compositions may further contain a solvent as components (F) and (H), respectively. Any desired solvent may be used as long as the components are uniformly dissolvable therein. Preferred solvents include alcohols such as methanol, ethanol, isopropanol, butanol, octanol, diacetone alcohol, and propylene glycol monomethyl ether; ketones such as acetone, methyl ethyl ketone, methyl isobutyl ketone, and cyclohexanone; esters such as ethyl acetate, butyl acetate, ethyl lactate, γ-butyrolactone, propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, and xylene; and amides such as dimethylformamide, dimethylacetamide and N-methylpyrrolidone. Inter alia, methanol, isopropanol, butanol, diacetone alcohol, propylene glycol monomethyl ether, methyl ethyl ketone, and methyl isobutyl ketone are preferred.

In order to form thin films, the first and second coating compositions are preferably adjusted to a solids concentration of 0.1 to 20% by weight.

According to the invention, an antireflection film is prepared by applying a first coating composition onto at least one surface of a substrate, irradiating the coating with actinic energy radiation to form a first cured film, applying a second coating composition onto the first cured film, and irradiating the coating with actinic energy radiation to form a second cured film. The resulting article is an antireflection film-bearing article.

The substrate on which the antireflection film lies is preferably selected from glass, plastic substrates or film. The materials of which the plastic substrates and film are made include polyethylene terephthalate, polyethylene naphthalate, polybutylene terephthalate, polyethylene, polypropylene, acrylic, polyvinyl chloride, nylon, polyacrylonitrile, polycarbonate, polyimide, and TAC. Surfactants and electroconductive particles may be incorporated in such materials to render them electroconductive or low resistive.

In a further embodiment, it is desired to manufacture an antireflection film-bearing article through a transfer process. In this embodiment, an antireflection film-bearing article is prepared by optionally forming a strippable layer on one surface of a temporary substrate, applying a second coating composition thereto, irradiating the coating with actinic energy radiation to form a second cured film, applying a first coating composition onto the second cured film, irradiating the coating with actinic energy radiation to form a first cured film, applying an adhesive or pressure-sensitive adhesive layer (for providing a bond to a primary substrate to be antireflection coated) thereto to form an antireflection film-forming laminate, attaching the laminate to a primary substrate (to be antireflection coated) with the adhesive or pressure-sensitive adhesive layer, and stripping the temporary substrate. The temporary substrate may be the same as the above-described substrate. The strippable layer is, for example, a fluoro-resin layer, a silicone resin layer or the like.

The adhesive or pressure-sensitive adhesive is not particularly limited as long as it adheres to the substrate and the first coating composition. Use may be made of (pressure-sensitive) adhesive compositions based on polyisoprene, styrene-butadiene random copolymers, styrene-isoprene block copolymers, butyl rubber, polyisobutylene, acrylic, silicone and the like. These (pressure-sensitive) adhesives are readily available as commercial products. The bond strength depends on the material of the substrate to which the laminate is transferred.

The method of applying the first and second coating compositions is not particularly limited and selected from among spin coating, roll coating, gravure coating, gravure offset coating, curtain flow coating, reverse coating, screen printing, spraying and dipping. A coating method capable of controlling a coating thickness is preferred, with the spin coating and gravure coating being more preferred. With respect to the coating thickness or weight, the first coating composition is preferably coated to form a first cured layer having a thickness in the range of 10 to 5,000 nm, more preferably 50 to 3,000 nm; and the second coating composition is preferably coated to form a second cured layer having a thickness in the range of 5 to 5,000 nm, more preferably 25 to 1,500 nm. The layers are adjusted to optimum thicknesses to incur interference to the incident light.

Adjustment of film thickness can be readily achieved by adjusting the solids concentration of each coating composition, that is, changing a solvent dilution factor in every coating step. The optimum thickness at which the incident light undergoes interference is $\lambda/2$ as an optical film thickness for the high refractive index layer and $\lambda/4$ as an optical film thickness for the low refractive index layer provided that the incident light has a wavelength $\lambda$. Film thicknesses closer to this relationship are preferred. The light sources for emitting actinic energy radiation for curing the first and second coating compositions include those for light in the 200 to 450 nm wavelength range, for example, high pressure mercury lamps, extra-high pressure mercury lamps, xenon lamps, and carbon arc lamps.

EXAMPLE

Examples of the invention are given below by way of illustration and not by way of limitation. Note that pbw is parts by weight.

Example 1

By mixing 100 pbw of a titanium-base compound oxide sol (dispersed in ethanol, solids 20 wt %, trade name Optolake by Catalysts & Chemicals Ind. Co., Ltd.), 20 pbw of trimethylol propane triacrylate, 1 pbw of Darocure 1173 (Ciba Specialty Chemicals), 1050 pbw of ethanol, 80 pbw of propylene glycol monomethyl ether, and 80 pbw of diacetone alcohol, a high refractive index coating composition A having a solids content of 3 wt % was prepared.

This coating composition was coated to a polyethylene terephthalate substrate by dipping. The coating was then irradiated with UV radiation in a dose of 600 mJ/m² (using a mercury lamp) for curing.

By mixing 100 pbw of hollow silica sol (dispersed in isopropyl alcohol, solids 20 wt %, trade name OSCAL by Catalysts & Chemicals Ind. Co., Ltd.), 20 pbw of an oxetane compound of formula (1), 0.8 pbw of $(C_{12}H_{25}-C_6H_4)_2-I^+.SbF_6^-$, 720 pbw of ethanol, 80 pbw of propylene glycol monomethyl ether, and 80 pbw of diacetone alcohol, a low refractive index coating composition I having a solids content of 4 wt % was prepared.

Formula (1)

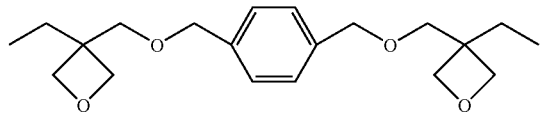

Similarly, this coating composition was coated to the previously cured coating by dipping and cured, forming an antireflection film. This antireflection film had a reflectance of 0.8 at 550 nm, a total light transmittance of 97.2%, and a haze of 0.8. In an abrasion test of rubbing 1,000 cycles with flannel fabric, the film remained intact.

Example 2

A coating composition B was prepared by the same procedure as coating composition A except that Biscoat 540 (bisphenol A diacrylate by Osaka Organic Chemical Industry Ltd.) was used instead of trimethylol propane triacrylate. A coating composition II was prepared by the same procedure as coating composition I except that $(R_{ox}CH_3SiO)_4$ wherein $R^{ox}$ is a group of formula (2) was used instead of the oxetane compound of formula (1). An antireflection film was prepared as in Example 1.

Formula (2)

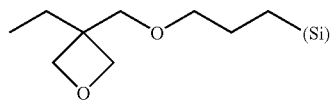

This antireflection film had a reflectance of 0.6 at 550 nm, a total light transmittance of 97.7%, and a haze of 0.7. In an abrasion test of rubbing 1,000 cycles with flannel fabric, the film remained intact.

Example 3

A coating composition III was prepared by the same procedure as coating composition I except that $(R^e CH_3SiO)_4$ wherein $R^e$ is 3,4-epoxycyclohexylethyl was used instead of the oxetane compound of formula (1). An antireflection film was prepared as in Example 1.

This antireflection film had a reflectance of 0.7 at 550 nm, a total light transmittance of 96.4%, and a haze of 0.8. In an abrasion test of rubbing 1,000 cycles with flannel fabric, the film remained intact.

Example 4

A coating composition B was prepared by the same procedure as coating composition A except that Biscoat 540 (bisphenol A diacrylate by Osaka Organic Chemical Industry Ltd.) was used instead of trimethylol propane triacrylate. A coating composition III was prepared by the same procedure as coating composition I except that $(R^e CH_3SiO)_4$ wherein $R^e$ is 3,4-epoxycyclohexylethyl was used instead of the oxetane compound of formula (1). An antireflection film was prepared as in Example 1.

This antireflection film had a reflectance of 0.2 at 550 nm, a total light transmittance of 98.3%, and a haze of 0.5. In an abrasion test of rubbing. 1,000 cycles with flannel fabric, the film remained intact.

Example 5

An antireflection film was prepared as in Example 4 except that a TAC substrate was used instead of the polyethylene terephthalate substrate.

This antireflection film had a reflectance of 0.3 at 550 nm, a total light transmittance of 98.0%, and a haze of 0.4. In an abrasion test of rubbing 1,000 cycles with flannel fabric, the film remained intact.

Example 6

A coating composition B was prepared by the same procedure as coating composition A except that Biscoat 540 (bisphenol A diacrylate by Osaka Organic Chemical Industry Ltd.) was used instead of trimethylol propane triacrylate. A coating composition IV was prepared by the same procedure as coating composition I except that Biscoat 540 (bisphenol A diacrylate) was used instead of the oxetane compound of formula (1) and 1 pbw of Darocure 1173 was used instead of 0.8 pbw of $(C_{12}H_{25}-C_6H_4)_2-I^+.SbF_6^-$. An antireflection film was prepared as in Example 1.

This antireflection film had a reflectance of 1.3 at 550 nm, a total light transmittance of 93.2%, and a haze of 2.3. In an abrasion test of rubbing 1,000 cycles with flannel fabric, the film remained intact.

Example 7

A coating composition B was prepared by the same procedure as coating composition A except that Biscoat 540 (bisphenol A diacrylate by Osaka Organic Chemical Industry Ltd.) was used instead of trimethylol propane triacrylate. A coating composition V was prepared by the same procedure as coating composition I except that 10 pbw of Biscoat 540 (bisphenol A diacrylate) and 10 pbw of $(R^e CH_3SiO)_4$ wherein $R^e$ is 3,4-epoxycyclohexylethyl were used instead of 20 pbw of the oxetane compound of formula (1), and 0.4 pbw of $(C_{12}H_{25}-C_6H_4)_2-I^+.SbF_6^-$ and 0.5 pbw of Darocure 1173 were used instead of 0.8 pbw of $(C_{12}H_{25}-C_6H_4)_2-I^+.SbF_6^-$. An antireflection film was prepared as in Example 1.

This antireflection film had a reflectance of 0.9 at 550 nm, a total light transmittance of 94.4%, and a haze of 1.4. In an abrasion test of rubbing 1,000 cycles with flannel fabric, the film remained intact.

Example 8

Coating composition III was coated onto a temporary polyethylene terephthalate substrate and cured by exposure to UV radiation in 600 mJ/m² from a mercury lamp. Coating composition B was coated onto the cured coating and cured by exposure to UV radiation in 600 mJ/m² from a mercury lamp. An acrylic base pressure-sensitive adhesive was coated onto the resulting laminate. The laminate was adhesively attached to another polyethylene terephthalate substrate (which was desired to be anti-reflective). Finally, the temporary polyethylene terephthalate substrate was stripped off, leaving an antireflection film-bearing article.

This antireflection film had a reflectance of 0.3 at 550 nm, a total light transmittance of 98.0%, and a haze of 0.6. In an abrasion test of rubbing 1,000 cycles with flannel fabric, the film remained intact.

Comparative Example 1

A coating composition X was prepared by the same procedure as coating composition III except that a void-free silica sol (dispersed in MEK, solids 20 wt %, trade name MEK-ST) was used instead of the hollow silica sol. A coating film was prepared as in Example 1.

This film had a reflectance of 4.7 at 550 nm, a total light transmittance of 94.1%, and a haze of 0.1. In an abrasion test of rubbing 1,000 cycles with flannel fabric, the film peeled from the substrate.

Comparative Example 2

A low refractive index, fluorinated coating composition was coated onto a temporary polyethylene terephthalate substrate. An attempt to apply coating composition B onto the fluorinated film failed because the fluorinated film was repellent.

It is evident from Comparative Example 1 that unless a voided silica sol is used, a film is endowed with no antireflection function and peels off.

It is evident from Comparative Example 2 that a low refractive index, fluorinated coating composition cannot form an antireflection film of the transfer type.

The antireflection film comprising high and low refractive index layers according to the invention possesses a high level of antireflection function despite the absence of fluorinated compounds in the low refractive index layer, is curable by exposure to actinic energy radiation, and has improved hardness, transparency, adhesion, processing cost and processing time. The elimination of fluorinated compounds allows a high refractive index layer to be formed on a low refractive index layer, enabling preparation of an antireflection film-forming laminate of the transfer type.

Japanese Patent Application No. 2002-279456 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An antireflection film, which comprises
   a high refractive index layer formed of a first coating composition in the cured state wherein said first coating composition primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and
   a low refractive index layer formed of a second coating composition in the cured state wherein said second coating composition primarily comprises (D) silica-base inorganic oxide fine particles having void in the interior and having an average particle size of 1 to 500 nm, and (C) a compound having at least two 3,4-epoxycyclohexyl groups in a molecule,
   wherein said high refractive index layer and said low refractive index layer are successively stacked.

2. An antireflection film-bearing article having an antireflection film of claim 1 formed on at least one surface of a substrate.

3. An antireflection film, which comprises
   a high refractive index layer formed of a first coating composition in the cured state wherein said first coating composition primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and
   a low refractive index layer formed of a second coating composition in the cured state wherein said second coating composition primarily comprises (D) silica-base inorganic oxide fine particles having void in the interior and having an average particle size of 1 to 500 nm, and (C) a silicone compound which contains at least two —$R^1CH_3SiO$— units, wherein $R^1$ is a substituent group which contains a 3,4-epoxycyclohexyl group, said silicone compound having a molecular weight of 500 to 2,100 and an epoxy equivalent of 180 to 270, and being free of an alkoxy group,
   wherein said high refractive index layer and said low refractive index layer are successively stacked.

4. An antireflection film-bearing article having an antireflection film of claim 3 formed on at least one surface of a substrate.

5. An antireflection film, which comprises
   a high refractive index layer formed of a first coating composition in the cured state wherein said first coating composition primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and
   a low refractive index layer formed of a second coating composition in the cured state wherein said second coating composition primarily comprises (D) silica-base inorganic oxide fine particles having void in the interior and having an average particle size of 1 to 500 nm, and (C) a compound having in a molecule at least two groups of at least one type selected from the group consisting of an epoxy and oxetane group
   each of the first and second coating compositions further comprising (G) a photoacid generator (G) having the formula: $R^4{}_2I^+X^-$ wherein $R^4$ is —$C_6H_4$—$R^5$, $R^5$ is an alkyl group having at least 6 carbon atoms, $X^-$ is $SbF_6^-$, $AsF_6^-$, $PF_6^-$, $BF_4^-$, $HSO_4^-$, $ClO_4^-$, $Cl^-$ or $CF_3SO_3^-$,
   wherein said high refractive index layer and said low refractive index layer are successively stacked.

6. An antireflection film-bearing article having an antireflection film of claim 5 formed on at least one surface of a substrate.

7. A method for preparing an antireflection film-bearing article, which comprises:
   applying a first coating composition which primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (E) a radical initiator and optionally (F) a first solvent onto at least one surface of a substrate, to obtain a coating of said first coating composition;
   irradiating said coating of said first coating composition with actinic energy radiation to form a first cured film;
   applying a second coating composition which primarily comprises (D) silica-base inorganic oxide fine particles having void in the interior and having an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (G) a photoacid generator and optionally (H) a second solvent onto said first cured film, to obtain a coating of said second coating composition; and
   irradiating said coating of said second coating composition with actinic energy radiation to form a second cured film.

8. A method for preparing an antireflection film-bearing article, which comprises:
   applying a second coating composition which primarily comprises (D) silica-base inorganic oxide fine particles having void in the interior and having an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (G) a photoacid generator and optionally (H) a second solvent onto one surface of a temporary substrate optionally having a strippable layer formed thereon, to obtain a coating of said second coating composition;

irradiating said coating of said second coating composition with actinic energy radiation to form a second cured film;

applying a first coating composition which primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (B) a radical initiator and optionally (F) a first solvent onto said second cured film, to obtain a coating of said first coating composition;

irradiating said coating of said second coating composition with actinic energy radiation to form a first cured film, and to obtain a laminate;

attaching said laminate to a substrate using an adhesive or pressure-sensitive adhesive; and stripping said temporary substrate.

9. A laminate, which is prepared by
applying a second coating composition which primarily comprises (D) silica-base inorganic oxide fine particles having void in the interior and having an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (G) a photoacid generator and optionally (H) a second solvent onto one surface of a temporary substrate optionally having a strippable layer formed thereon, to obtain a coating of said second coating composition;

irradiating said coating of said second coating composition with actinic energy radiation to form a second cured film;

applying a first coating composition which primarily comprises (A) metal oxide fine particles comprising at least one oxide selected from the group consisting of titanium oxide, aluminum oxide, zirconium oxide, cerium oxide, iron oxide, tin oxide, and compound oxides thereof, wherein said metal oxide has an average particle size of 1 to 500 nm, and (B) a compound having in a molecule at least one group of at least one type selected from the group consisting of an acrylic, methacrylic, vinyl and styryl group, and/or (C) a compound having in a molecule at least two groups of at least one type selected from the group consisting of an epoxy and oxetane group, and (E) a radical initiator and optionally (F) a first solvent onto the second cured film, to obtain a coating of said first coating composition;

irradiating said coating with actinic energy radiation to form a first cured film; and forming an adhesive or pressure-sensitive adhesive layer on said first cured film.

* * * * *